United States Patent
Yamada et al.

(10) Patent No.: US 11,566,560 B1
(45) Date of Patent: Jan. 31, 2023

(54) CONTROLLED CHARGE AIR COOLER ACCUMULATED WATER DRAINING METHOD BY USING THROTTLE-PLATE DELTA PRESSURE AND METERING ORIFICE

(71) Applicant: FORD GLOBAL TECHNOLOGIES, LLC, Dearborn, MI (US)

(72) Inventors: Shuya Shark Yamada, Novi, MI (US); Shawn Spannbauer, Royal Oak, MI (US); Stephen George Russ, Canton, MI (US); Richard Germek, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/671,440

(22) Filed: Feb. 14, 2022

(51) Int. Cl.
*F02B 29/04* (2006.01)
*F02D 41/00* (2006.01)
*F02M 25/022* (2006.01)
*F02M 25/028* (2006.01)
*F02M 31/13* (2006.01)

(52) U.S. Cl.
CPC ...... *F02B 29/0468* (2013.01); *F02B 29/0406* (2013.01); *F02D 41/0002* (2013.01); *F02D 41/0025* (2013.01); *F02M 25/028* (2013.01); *F02M 25/0221* (2013.01); *F02M 25/0227* (2013.01); *F02M 31/13* (2013.01)

(58) Field of Classification Search
CPC ............ F02M 25/0221; F02M 25/0227; F02D 41/0025; F02D 41/0002; F02B 29/0406; F02B 29/0468
See application file for complete search history.

(56) References Cited

U.S. PATENT DOCUMENTS

| | | | |
|---|---|---|---|
| 9,127,607 B2 | 9/2015 | Glugla et al. | |
| 9,145,823 B2 | 9/2015 | Glugla et al. | |
| 9,151,214 B2 | 10/2015 | Glugla et al. | |
| 9,181,853 B2 * | 11/2015 | Leone | F01M 13/028 |
| 9,267,423 B2 | 2/2016 | Russ et al. | |
| 9,284,880 B2 | 3/2016 | Glugla | |
| 9,488,152 B2 | 11/2016 | Glugla et al. | |
| 9,638,094 B2 * | 5/2017 | Cardwell | F02B 29/0468 |
| 10,473,061 B2 | 11/2019 | Martin et al. | |
| 2014/0352661 A1 * | 12/2014 | Glugla | F02D 41/3029 123/406.19 |

FOREIGN PATENT DOCUMENTS

DE 102009042981 A1 4/2010
WO 2017082481 A1 5/2017

* cited by examiner

*Primary Examiner* — Kevin A Lathers
(74) *Attorney, Agent, or Firm* — Vincent Mastrogiacomo; Brooks Kushman P.C.

(57) ABSTRACT

A system and method for discharging condensation from an engine system is disclosed. The system includes a drainage pathway from an upstream body that collects water to a downstream portion of the air intake system. A controller may initiate a draining event upon determining a threshold amount of water has been collected in the upstream body.

18 Claims, 1 Drawing Sheet

CONTROLLED CHARGE AIR COOLER ACCUMULATED WATER DRAINING METHOD BY USING THROTTLE-PLATE DELTA PRESSURE AND METERING ORIFICE

TECHNICAL FIELD

The instant disclosure relates to engine or air intake systems. More specifically, the instant disclosure relates to managing and/or discharging condensation from an engine or air intake system.

BACKGROUND

Engine systems are prevalent throughout modern life. Engine systems convert other forms of energy into mechanical energy. But engine systems often rely on ambient air as fuel and/or for cooling. However, the composition of ambient or external air may vary based on weather conditions, location, and numerous other factors. Ambient air generally includes some degree of moisture. Too much moisture can be detrimental to engine systems.

SUMMARY

A vehicle or engine system is disclosed. The system includes an air intake system, a drainage pathway, an engine, and a controller. The air intake system may include a charge air cooler and throttle body. The throttle body is downstream of the charge air cooler and is in operable fluid communication with the charge air cooler. The engine is downstream and is in operable fluid communication with the throttle body. The drainage pathway has a first end connected to the charge air cooler and a second end connected to a downstream portion of the air intake system proximate to the throttle body. The controller is configured to initiate a draining event upon determining a threshold amount of water has been accumulated.

An air intake system is disclosed. The air intake system includes a fresh air intake, a charge air cooler, a throttle body and a controller. The charge air cooler is downstream from and in fluid communication with the fresh air intake. The throttle body includes a throttle valve and is downstream and in fluid communication with the charge air cooler. The controller is configured to detect or predict a threshold amount of water in the charge air cooler and dispose the throttle valve in a closed position to initiate a draining event.

A method of discharging water from a vehicle or engine system is disclosed. The method includes the steps of detecting or predicting a threshold amount of water in an air intake system, creating a pressure differential within the air intake system, agitating water from a drainage pathway as the water is reintroduced into the air intake system, energizing a heating element of an engine, and increasing an idle rate of the engine.

DETAILED DESCRIPTION

Figure 1:
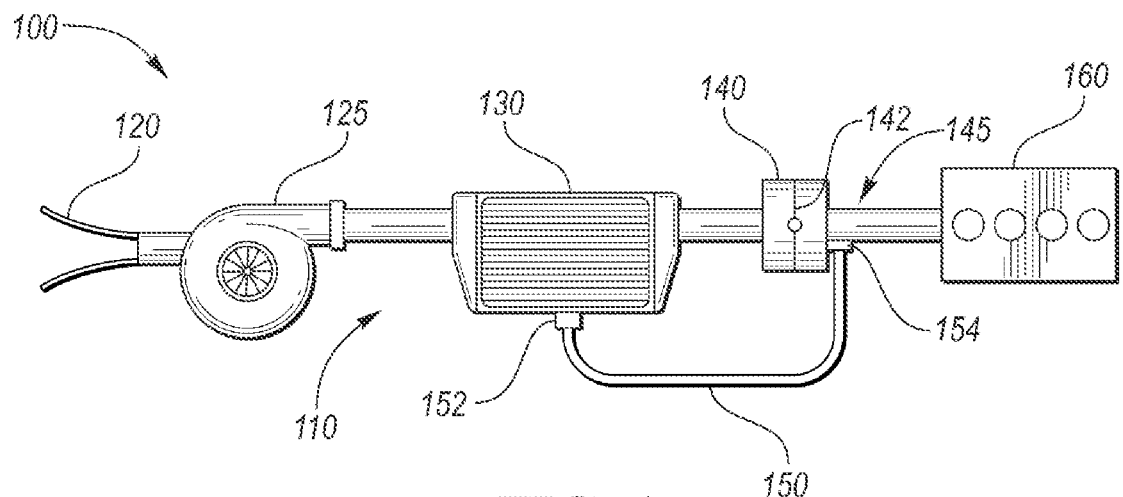
FIG. 1 is a schematic view of an engine system.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight. The first definition of an acronym or other abbreviation applies to all subsequent uses herein of the same abbreviation and applies mutatis mutandis to normal grammatical variations of the initially defined abbreviation. Further, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Processes executed by a vehicle computing system located in a vehicle may be discussed herein, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In the illustrative embodiments discussed herein, an exemplary, non-limiting example of a process performable by a computing system may be shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As shown in FIG. 1, a vehicle or engine system 100 is disclosed. The system 100 includes an air intake system 110, a drainage pathway 150, an engine 160 and a controller. The air intake system 110 includes a fresh air intake 120, a charge air cooler 130, and a throttle body 140. The drainage pathway 150 is configured to drain fluid (e.g., water) from an upstream body such as the charge air cooler 130 and reintroduces the fluid in a downstream portion 145 of the air intake system 110. The controller is configured to detect or predict when a threshold amount of water is within the air intake system 110, upstream body, and/or drainage pathway 150. The controller is then configured to engage a water drainage/discharge event.

The air intake system 110 may include a fresh air intake 120, a compressor 125 (e.g., supercharger or turbocharger), a charge air cooler 130, and a throttle body 140. The air intake system 110 is responsible for providing air to the engine 160. A throttle valve 142 in the throttle body 140 manages the air from the air intake system 110 to the engine 160. The air then travels from the throttle body 140 to air manifold of the engine 160. A downstream portion 145 of the air intake system 110 proximate to the throttle body 140 may be turbulent due to air flow changes in the throttle body 140 and/or around the throttle valve 142. In one embodiment, downstream portion 145 is downstream of the throttle body 140 (e.g., near the trailing edge) so it does not interfere with a MAP sensor that is located upstream and proximate to the throttle body 140. During operation, the components of the system 100 may be in fluid communication with one another. For example, the fresh air intake 120 may be in fluid communication with the compressor 125, which may be in fluid communication with the charge air cooler 130. The charge air cooler 130 may be in fluid communication with the throttle body 140 which is in fluid communication with the engine 160.

The fresh air intake 120 may be any shape or size for receiving air from the external environment and provides a supply of air to the air intake system 110 and engine 160. The air intake system 120 may include a compressor 125 such as a turbocharger or supercharger. The compressor 125 increases the output power of the engine 160 by compressing the air prior to combustion. However, the compressor 125 can also increase the temperature of air which acts contrary to its purpose of compressing, i.e., cold air has a greater density than warm/hot air. Accordingly, a cooler such as a charge air cooler 130 may be employed to cool the compressed air and further increase the density of the air provided to the engine 160. As a result of cooling the air, the charge air cooler 130 can lead to condensation and collect/accumulate water.

The charge air cooler 130 may be in fluid communication with the throttle body 140 and provide cooled compressed air to the throttle body 140 during operation. The throttle body 140 may include a throttle valve 142 such as but not limited to a butterfly valve. The throttle valve may have a fully opened position such that the max amount of air may be supplied to the engine 160. The throttle valve 142 may be turned, angled, or closed to manage the air provided to the engine 160. In general, the engine output power is greater when a greater amount of air is provided. The throttle valve 142 may also be responsible for creating a pressure differential in the air intake system 110. For example, when the throttle valve 142 is at least partially closed the air pressure upstream of the throttle valve 142 may be greater than the air pressure downstream of the throttle valve 142. The differential when created by the throttle valve 142 maybe referred to or identified as the throttle-plate delta pressure (TPDP).

The engine 160 may be any shape and size. In a variation, the engine 160 is a combustion engine 160 and may have one or more combustion cylinders (e.g., 2, 4, 6 or 8 cylinders). The engine 160 is downstream from the throttle body 140. Too much water in the engine 160 or combustion chambers can decrease performance or interfere with the operation of the engine 160. However, many variables determine how much water is too great. For example, the size of the engine 160, temperature, and/or combustion rate (e.g., idle rate) may be a few variables that affect the amount of water an engine can consume/tolerate without significant interference or hydrolocking. In a refinement, the engine 160 may include one or more heating elements such as glow plugs for increasing the temperature.

However, as described above water may flow through the air intake system 110 and/or collect in the air intake system 110 or more particularly the charge air cooler 130. Environmental conditions such as weather, humidity, and temperature may further contribute to the amount of water collected within the charge air cooler 130 and system 110. A drainage pathway 150 may connect an upstream body that collects water such as the charge air cooler 130 with a downstream portion 145 such as the air intake system 110 proximate to the throttle body 140. Water may be collected in the drainage pathway 150 or may flow directly through the drainage pathway 150 to the air intake system 110. It may be desirable to agitate the water prior to reintroducing it into the air intake system 110. If the downstream portion 145 is proximate to the throttle bottle 140, vibration or turbulence from the throttle body 140 may assist in agitating the water as it is reintroduced into the air intake system 110.

The throttle valve 142 may also provide a pressure differential that assists in drawing the water from the upstream body to the downstream portion 145. For example, the throttle valve 142 may be closed by angling the valve 55 to 80 degrees, or more preferably 60 to 75 degrees, or even more preferably 65-70 degrees from the fully open position. In a variation, the throttle valve 142 may be closed to a degree such that the throttle-plate delta pressure may be 4 to 10, or more preferably 5 to 7, or even more preferably 5.5 to 6.0 kPa. The drainage pathway 150 may further include one or more metering devices 152, 154 for managing the rate at which water can travel from the upstream body to the downstream portion 145. In a refinement, the metering devices 152, 154 may include a metering orifice. For example, the metering orifice may be 0.5 to 3.5 mm, or more preferably 1 to 3 mm, or even more preferably 1.5 to 2.5 mm.

Figure 2:
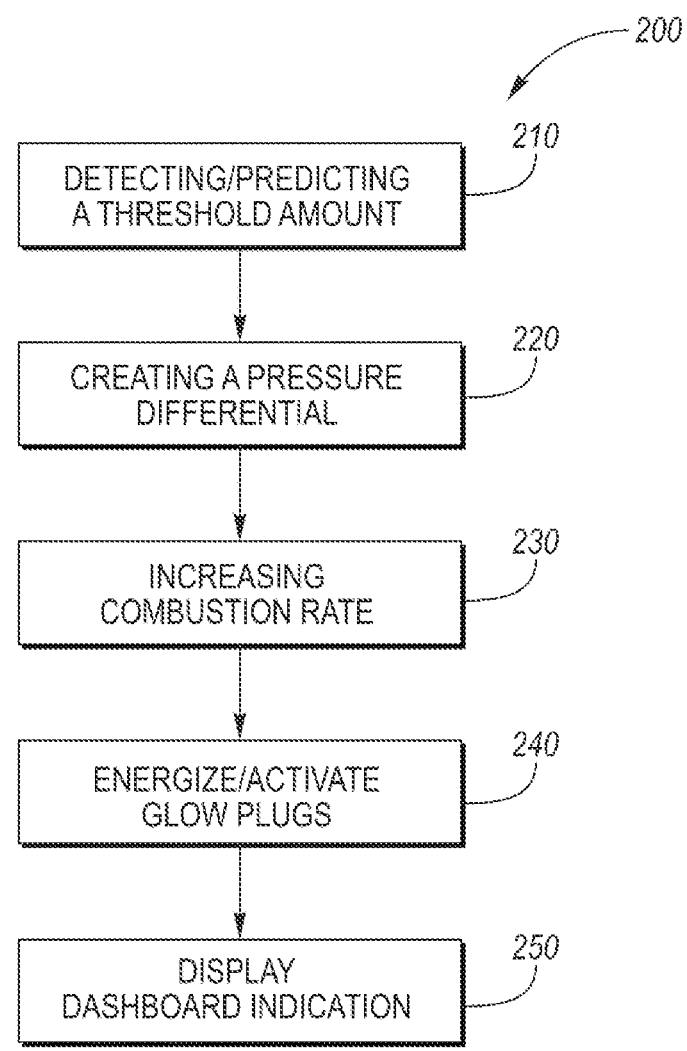
FIG. 2 is a flowchart illustrating a method of draining water from an engine system.

A controller may be used to control the various components described herein. In a variation, the controller may be configured to initiate a draining event. A draining event may include creating a pressure differential such as by closing the throttle valve, increasing the idle rate of the engine, or activating or energizing a heating element such as glow plugs or a combination thereof, as shown in FIG. 2. The draining event may also include displaying a draining event dashboard indication. The draining event may only need to be invoked during unusual or uncommon circumstances that result in a substantial amount of condensation in an upstream body or the charge air cooler 130. In a refinement, the engine combustion rate may be increased from a default idle rate of no more than 2 pounds per minute, or more preferably no more than 1 pound per minute to at least 2 pounds per minute, or at least 3 pounds per minute. Said differently, the combustion rate may be increased by at least 1 pound per minute, more preferably at least 2 pounds per minute, or even more preferably at least 3 pounds per minute. For example, a default idle rate of 1 to 2 pounds per minute may be increased to a draining idle rate of 2 to 3 pounds per minute. The one or more heating elements (e.g., glow plugs) may be energized or activated such that the heating element may, for example, operate at a temperature of 750 to 1200° C., or more preferably 800 to 1150° C., or even more preferably 850 to 1100° C.

The draining event may be initiated during high condensation circumstances. In a refinement, the draining event may be actuated periodically. In yet another refinement, the draining event may be actuated upon detecting a threshold amount of water. For example, the upstream body/charge air cooler 130/draining pathway 150 may include a sensor for detecting when a threshold amount of water is accumulated. The sensor may communicate with the controller such that the controller then initiates a draining event. In yet another variation, the draining event may be initiated upon predicting that a threshold amount of water will accumulate within the upstream body, charge air cooler 130, and/or draining pathway 150. For example, the controller may be in communication with one or more sensors that detect the environmental conditions such as temperature, humidity, precipitation, etc. In still another variation, the controller may predict the threshold amount will be achieved by information provided to it from another device or over the Internet. Similarly, a combination of these mechanism may be used determine a threshold amount of water has been achieved.

In yet another embodiment a method 200 is disclosed. The method 200 includes detecting and/or predicting a threshold amount of water in an air intake system (i.e., step 210), creating a pressure differential in the air intake system (i.e., step 220), increasing the combustion rate (i.e., step 230), energizing/activating a heating element (i.e., step 240), displaying an indication of a draining event (i.e., step 250) or a combination thereof. A vehicle/engine/air intake system may detect or predict the threshold amount of water via sensors detecting information inside and/or outside the air intake system. The system may also obtain information such as weather and/or operation information (e.g., speed, RPMs, combustion rate, etc.). The pressure differential may be created via a throttle having a throttle body and a throttle valve. The throttle valve may be closed at least partially such that the pressure downstream is less than the pressure upstream. The pressure differential may facilitate or draw water from an upstream body, reservoir and/or a drainage pathway. The heating element may include one or more glow plugs. The indication of a draining event may be shown via a dashboard light or on a screen.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. An engine system comprising:
   an air intake system including a charge air cooler and a throttle body having a throttle valve and being downstream of the charge air cooler, the air intake system providing operable fluid communication between the charge air cooler and the throttle body;

an engine downstream of the throttle body;

a drainage pathway having a first and second end, the first end connected to the charge air cooler and the second end connected to the air intake system downstream of the throttle body; and a controller configured to initiate a draining event responsive to an indication that a threshold amount of water has been collected in the air intake system, the draining event including at least partially closing the throttle valve such that a pressure differential is generated.

2. The engine system of claim 1, wherein the controller is configured to close the throttle valve 55-80 degrees from a full throttle position during the draining event.

3. The engine system of claim 1, wherein the air intake system has a turbulent portion proximate to and downstream from the throttle body and the second end of the drainage pathway is connected to the turbulent portion.

4. The engine system of claim 3, wherein the turbulent portion agitates water in the drainage pathway during operation.

5. The engine system of claim 1, wherein the controller is configured to energize a glow plug within the engine and operate at a draining idle rate that is greater than a default idle rate during the draining event.

6. The engine system of claim 5, wherein a combustion rate of the engine is increased by at least 1 lb/min.

7. The engine system of claim 1, wherein the drainage pathway includes a metering device.

8. The engine system of claim 1, wherein the drainage pathway includes a water metering orifice having a width of 0.5 to 3.5 mm.

9. The engine system of claim 1, wherein the drainage event is initiated by the controller upon detecting or predicting the threshold amount of water has been collected in the charge air cooler.

10. The engine system of claim 1, wherein a dashboard indication is displayed during the draining event.

11. An air intake system comprising:

a fresh air intake;

a charge air cooler downstream from and in fluid communication with the fresh air intake;

a throttle body including a throttle valve downstream and in fluid communication with the charge air cooler;

a drainage pathway providing selective fluid communication between the charge air cooler and a downstream portion downstream of the throttle valve; and a controller configured to detect or predict a threshold amount of water in the charge air cooler and then dispose the throttle valve in a closed position to initiate a draining event.

12. The air intake system of claim 11, wherein the closed position is 55-80 degrees from a full throttle position.

13. The air intake system of claim 11, wherein the controller is configured to energize a glow plug after detecting the threshold amount.

14. The air intake system of claim 13, wherein the controller is configured to increase a default idle rate of an engine after detecting the threshold amount.

15. A method of discharging water from a vehicle system comprising:

detecting or predicting a threshold amount of water from an air intake system;

creating a pressure differential within the air intake system by at least partially closing the throttle valve such that it draws water from an upstream body to a downstream portion via a drainage pathway;

agitating the water as the water is reintroduced from the drainage pathway into the air intake system;

energizing a heating element of an engine; and increasing an idle rate of the engine.

16. The vehicle system of claim 15, wherein the upstream body is a charge air cooler.

17. The vehicle system of claim 16, wherein the pressure differential is created by disposing a throttle valve in a closed position.

18. The vehicle system of claim 17, wherein the downstream portion is proximate to a throttle body.

* * * * *